May 22, 1934.   A. L. DAVIS   1,959,857
MUG
Filed Sept. 20, 1933
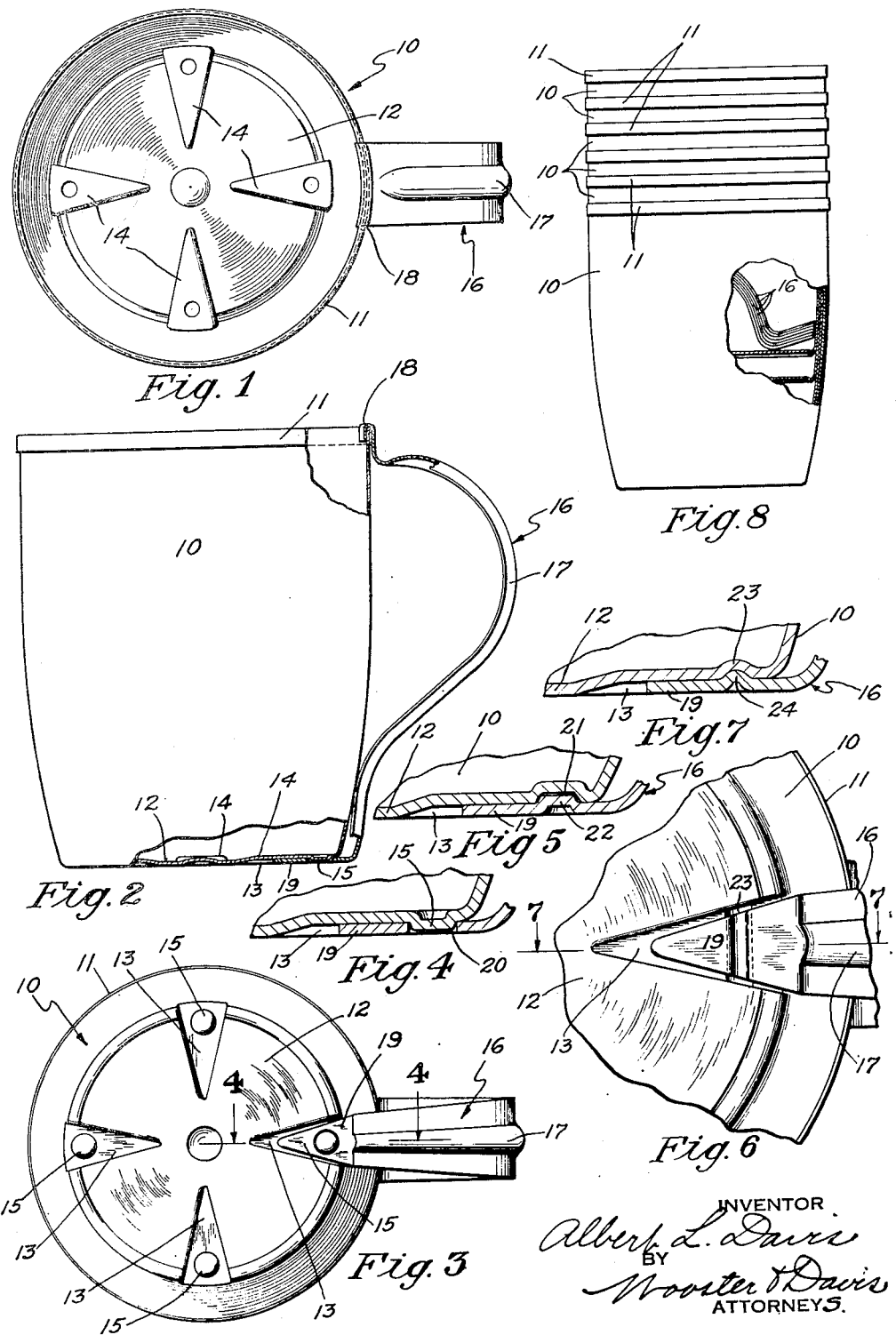

Patented May 22, 1934

1,959,857

UNITED STATES PATENT OFFICE 1,959,857

MUG

Albert L. Davis, Watertown, Conn., assignor to The Waterbury Brass Goods Corporation, Waterbury, Conn., a corporation of Connecticut Application September 20, 1933, Serial No. 690,244

5 Claims. (Cl. 65—13)

This invention relates to new and useful improvements in mugs and has particular relation to metal mugs.

An object of the invention is to provide a mug including a detachable metal handle and means whereby the handle may be readily applied to and removed from the mug.

Another object is to provide a mug having a detachable handle and wherein the construction is such that with their handles removed a series of the mugs may be nested to occupy but a small space with the handles of a plurality of mugs stored or packed in the upper or outermost of the nested mugs.

A further object is to provide a mug and a detachable handle for the same and means whereby the handle may be quickly and securely attached or applied to the mug.

Another object is to provide a mug as stated and wherein the handle attaching means does not project beyond the lower surface of the mug whereby the latter will seat level on a table or other support.

A further object is to provide a mug having a detachable handle and including means whereby the handle may be readily attached to the body or cup of the mug in any selected one of a plurality of positions.

Other objects and advantages will become apparent from a consideration of the following detailed description taken in connection with the accompanying drawing wherein satisfactory embodiments of the invention are shown. However, it will be understood that the invention is not limited to the details disclosed but includes all such variations and modifications as fall within the spirit of the invention and the scope of the appended claims.

In the drawing:

Fig. 1 is a top plan view showing a mug constructed according to the present invention;

Fig. 2 is a side elevational view thereof, parts being broken away;

Fig. 3 is a bottom plan view of the mug;

Fig. 4 is an enlarged detail sectional view taken substantially along the line 4—4 of Fig. 3;

Fig. 5 is a view similar to Fig. 4 but showing a slightly modified construction;

Fig. 6 is an enlarged plan view of a portion of the bottom of a mug showing a further slightly modified construction;

Fig. 7 is a sectonal vew taken substantially along the line 7—7 of Fig. 6; and

Fig. 8 is an elevational view, parts being broken away, showing a series of the mugs nested and with the handles packed in the uppermost mug.

Referring in detail to the drawing, and at first more particularly to Figs. 1 through 4, the improved mug includes a cup-like drawn sheet metal body 10 which is preferably of copper although it may be of other metal and the body may be plated if so desired. Body 10 includes an upper edge portion 11 thickened as by doubling the metal of such portion upon itself as most clearly shown in Fig. 2. At one or more spaced points the bottom wall 12 of the body is provided in its lower surface with recesses 13. As disclosed four recesses 13 are provided although it will be understood that this number is not critical and that a greater or lesser number of recesses may be formed as desired. Preferably recesses 13 are formed by pressing portions of the bottom wall upwardly and such operation results in the formation of raised portions 14 on the inner surface of the bottom of the mug, such raised portions corresponding with the shape of the recesses 13.

A nub 15 is pressed downwardly from the bottom wall of each recess 13 and it is particularly noted that these nubs 15 are of such depth as not to project below the plane of the lower surface of the bottom of the mug. Attention is also directed to the fact that the recesses 13 extend through the lower edge of the side wall of the body 10 so that said recesses in effect extend from the outer edge of the bottom of the body toward the center thereof.

A handle 16 is provided for each body 10 and these handles are preferably formed of a springy metal and the strap portion of each handle may be provided with or have pressed therefrom a bead or rib 17 such bead or rib serving to ornament the handle and also to give it more strength and stiffness. The upper end portion of each handle is bent upon itself to provide a hook-like portion 18 and such portion is shaped to hook over the thickened upper edge 11 of the mug and to snugly receive such edge portion as clearly shown.

At its lower end each handle 16 includes a portion or tongue 19 which may be formed by bending the lower end of the handle inwardly and such portion 19 is of a shape to be received in one of the recesses 13 and is provided with an opening 20 to receive the nub 15 projecting from the bottom wall of the recess into which said portion is introduced. In its normal condition the handle 16 is of somewhat less length than the height of the body 10 and the portion 19 of the handle is snapped or forced into a recess 13 and the spring action of the handle holds such portion in the recess with a nub or lug 15 in the opening 20. In this way the handle is rigidly secured to the body but may be readily removed therefrom simply by forcing the portion 19 of the handle downwardly to free it from the nub 15.

It is noted that the portion 19 of the handle is of a thickness equal to or less than the depth of any one of the recesses 13 whereby when the handle is attached to the body the mug will seat level on a table or other flat support. When attaching the handle to the body 10 the hooked upper end 18 of the handle is disposed over the upper edge of said body with its portion 19 in alignment with any selected one of the recesses 13. Thereafter, the handle is sprung to dispose its portion 19 in the selected recess and the spring action of the handle draws such portion against the bottom wall of the recess with the nub 15 of the recess located in the opening 20 of the handle.

Fig. 5 shows a slightly modified arrangement wherein in lieu of a downwardly extending nub 15 a portion of the bottom wall of each of the recesses 13 is forced or pressed upwardly providing a depression 21 in said wall. Similarly, in place of the opening 20 the portion 19 of the handle has a part pressed upwardly therefrom providing an upwardly extending nub 22 adapted to seat in said depression 21 when the handle is assembled on the body 10. In other respects the mug of Fig. 5 is of the same construction as the mug of Figs. 1 through 4 and the operation of mounting the handle on the body and removing it therefrom is the same as that already described with the exception that the lug or nub 22 of the handle is located in the depression 21 as distinguished from locating a lug or nub on the body in an opening or recess in the handle.

Figs. 6 and 7 show yet another slightly modified arrangement and according to these figures a bead or rib 23 is pressed upwardly in the bottom wall of each recess 13 thereby providing a transversely extending depression in said recess. To cooperate with such transversely extending depression the portion 19 of the handle is pressed to form a transversely extending bead adapted to snap into said depression as said portion 19 is forced or sprung into a selected recess 13.

It will be understood that all of the various recesses, where a number of them are provided in the bottom wall of the body 10, should be of the same construction so that a handle may be readily attached to such body by disposing the portion 19 of the handle in any selected recess. That is, if one recess of a body is provided with a nub or lug 15 then all recesses of that body should likewise be provided with such lug or nub and if the constructions of the modifications are followed then the same construction should be carried out for each recess. When this is done, the same handle may be readily applied in several different positions about the body. Also, the portion 19 of a handle should never be of such thickness as to project below the lower surface of the bottom wall of the mug and since such handle portion does not project out of the recess 13 in which it is located, the mug may be seated level on a support. The reaction of the inwardly extending portion 19 of the handle on the bottom wall of the body retains the upper portion 18 hooked over the edge of the cup, and also provides a positive support for the cup. Each recess 13 and the portion 19 of the handle are substantially V-shaped to facilitate centering engagement when the portion 19 is forced into the recess.

Fig. 8 shows how the bodies 10 of a series of mugs may be nested one within the other when their handles 16 have been removed. It will also be noted in this figure that the handles may be grouped together and a plurality of them packed or stored within the upper or outermost of the nested bodies. From this it will be apparent that a large quantity of the mugs of the present invention may be stored or packed in a relatively small space and that a large quantity of such mugs may accordingly be shipped in a relatively small container.

Having thus set forth the nature of my invention, what I claim is:

1. In a mug, a cup-like body having a recess in the lower surface of its bottom wall extending radially through the outer edge toward the center, a spring handle including at its upper end means to detachably engage the upper edge of the body, a portion on the lower end of said handle correspondingly shaped to the recess and adapted to enter and substantially fill the same, and cooperating means between said parts when interengaged to detachably secure the said lower handle portion in the recess.

2. In a mug, a cup-like body having a substantially V-shaped recess in the lower surface of its bottom wall with its opening terminating in the outer edge thereof, a spring handle engageable at its upper end with the top edge of the body, a substantially V-shaped portion on the lower end of the handle adapted to be forced into the recess under tension, and cooperating means between said portion and the recess to detachably secure the same in position.

3. In a mug, a cup-like body having a recess in the lower surface of its bottom wall, a handle including at its upper end means to detachably engage an upper portion of said body, a portion on the lower end of said handle to enter said recess and lie within the plane of the lower surface of the bottom of the body, a nub projecting from the lower wall of said body into said recess, and said second mentioned portion having an opening receiving said nub whereby the handle is detachably secured to the body with its portion in said recess.

4. In a mug, a cup-like body having a recess in the lower surface of its bottom wall, a handle including at its upper end means to detachably engage an upper portion of said body, a portion on the lower end of said handle to enter said recess and lie within the plane of the lower surface of the bottom of the body, said body having a depression in the bottom wall of said recess, and a nub on said portion and entering said depression whereby the handle is detachably secured to the body with its portion in said recess.

5. In a mug, a cup-like body having a recess in the lower surface of its bottom wall, a handle including at its upper end means to detachably engage an upper portion of said body, a portion on the lower end of said handle to enter said recess and lie within the plane of the lower surface of the bottom of the body, an inwardly extending bead in the bottom wall of said body across said recess, and an upwardly extending bead on said handle portion and entering the bead in the bottom wall of the body to secure the handle to the body.

ALBERT L. DAVIS.